Sept. 22, 1964  F. T. WIMBERLY ETAL  3,150,365
NAVIGATION SYSTEMS
Filed Oct. 20, 1959  3 Sheets-Sheet 1
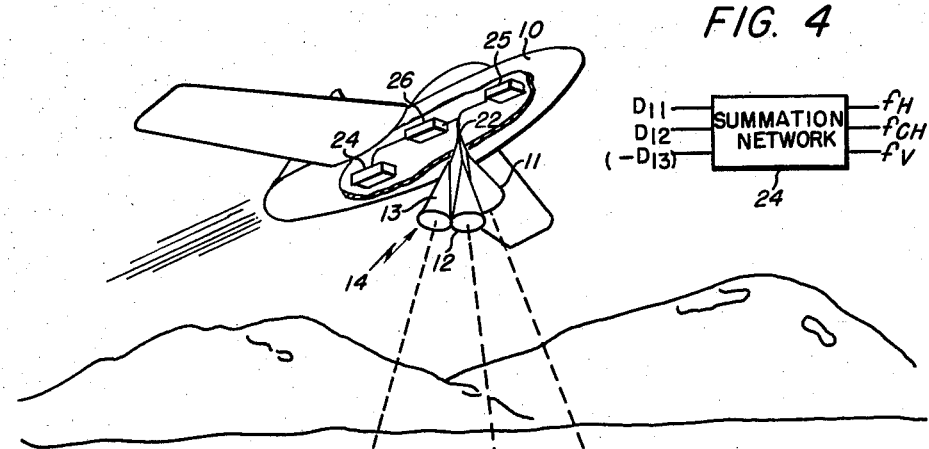
FIG. 4
FIG. 1
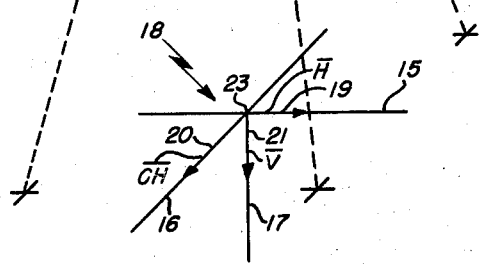
FIG. 2
FIG. 3
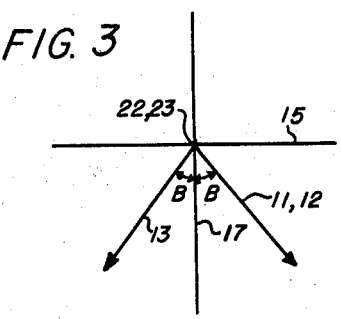
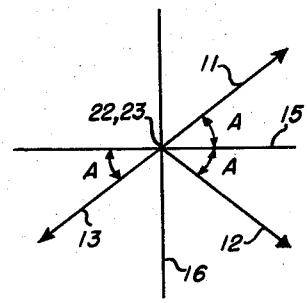
INVENTORS
FLOYD T. WIMBERLY
WILLARD W. McLEOD, JR.
KURT M. KRAMP
BY *H. Vincent Harsha*
ATTORNEY

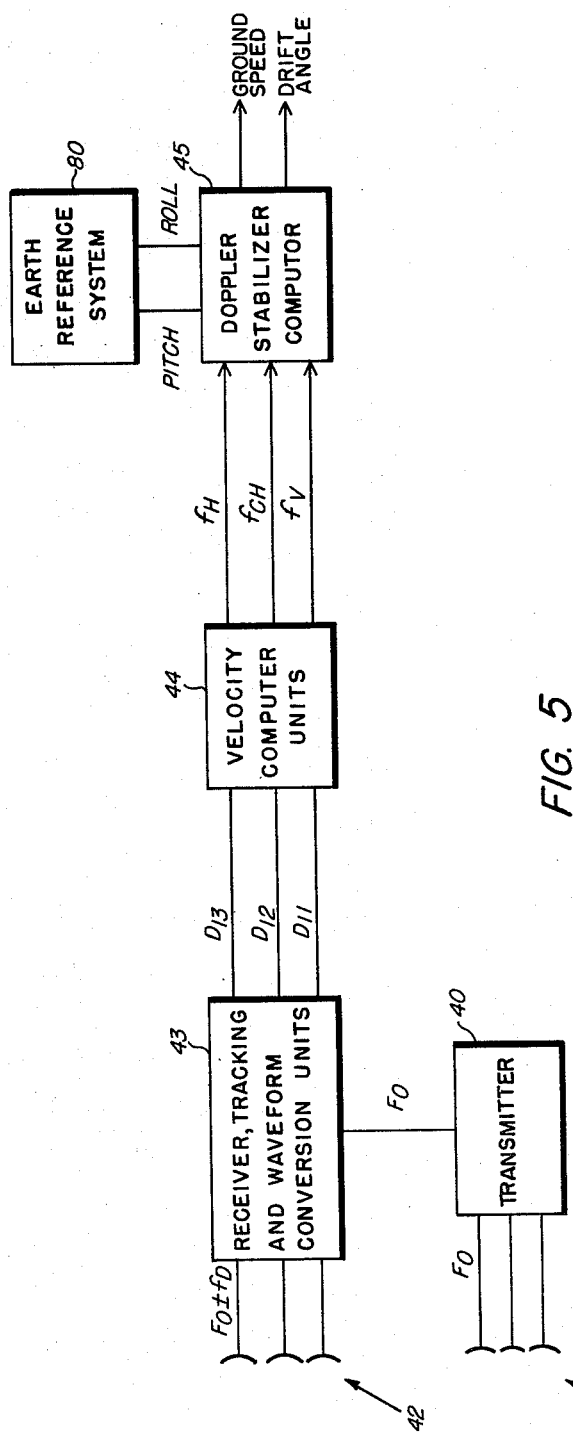

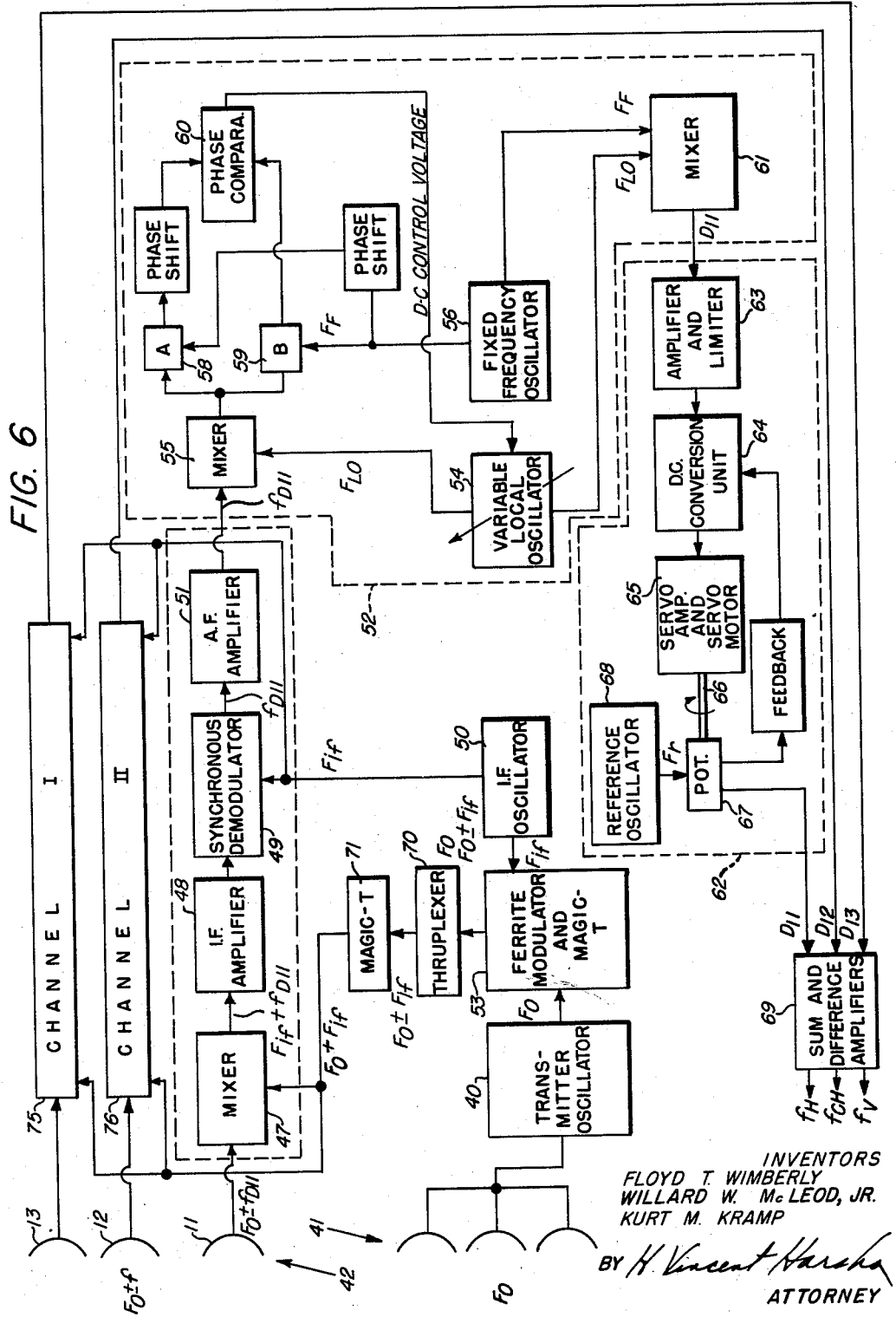

3,150,365
NAVIGATION SYSTEMS
Floyd T. Wimberly, Willard W. McLeod, Jr., and Kurt M. Kramp, Lexington, Mass., assignors to Raytheon Company, Lexington, Mass., a corporation of Delaware
Filed Oct. 20, 1959, Ser. No. 847,606
7 Claims. (Cl. 343—9)

This is a continuation-in-part of an application, Serial No. 758,051, filed August 29, 1958, of Willard W. McLeod, Jr., now Patent Number 3,096,515.

This invention relates generally to Doppler navigation systems and, more particularly, to systems utilizing three antennas for Doppler navigation.

Conventional Doppler navigation systems have usually required a relatively large amount of associated electronic equipment. Normally, in order to get the required Doppler signals to control an aircraft or to measure its motion, for instance, relatively complicated computers have to be used. This invention provides a simplified antenna system for use in Doppler navigators. The simplifications involved make it possible to reduce the size and weight of associated electronic equipment to a large extent.

In Doppler navigation it is desirable to obtain signals proportional to the velocity of a moving aircraft with reference to a particular coordinate system. For example, if we select a coordinate system having orthogonal coordinates along the directions of the aircraft heading velocity vector, cross-heading velocity vector and vertical velocity vector, it is necessary to provide three signals $f_H$, $f_{CH}$ and $f_V$ having frequencies or amplitudes proportional to these velocities, respectively. In conventional systems, it has been required that the Doppler signals obtained at each of the antennas be multiplied by appropriate trigonometric functions which are defined by the angular relationships existing between the individual antenna positions and the reference coordinates. This invention, however, eliminates the necessity for providing an elaborate computer to perform these trigonometric computations. The computations involved are simplified considerably by mounting the antennas of the invention so that unique predetermined angular relationships exist between each of the antenna positions and the reference coordinates.

For example, in one embodiment of the invention, a first antenna is mounted within the aircraft so that its beam is pointed forward along one side of the positive heading velocity vector and in a downward direction along the positive vertical velocity vector. The first antenna beam thereby subtends a first predetermined angle with respect to the positive heading velocity vector and a second predetermined angle with respect to the positive vertical velocity vector. A second antenna is mounted so that its beam is pointed forward along the opposite side of the positive heading velocity vector and also in a downward direction along the positive vertical velocity vector. The second antenna beam is thereby arranged to subtend an angle with respect to the positive heading velocity vector and an angle with respect to the vertical velocity vector, the magnitudes of which are equal to those subtended by the first antenna beam. A third antenna is mounted so that its beam is pointed to the rear along the negative heading velocity vector and in a downward direction along the positive vertical velocity vector. The third antenna beam is thereby arranged to subtend an angle with respect to the negative heading velocity vector and an angle with respect to the positive vertical velocity vector, the magnitudes of which are also equal to those subtended by the first antenna beam. By this choice of antenna orientation, all of the trigonometric functions of the antennas are identical with the exception of their signs. The Doppler return signals thereby can be directly combined to provide the required control signals without the need of any complicated equipment to provide trigonometric computations.

In this invention, the Doppler return signals from the antennas are operated upon by receiving elements which provide Doppler signals in the form of spectrum signals which are then fed to tracking units which change the form of the Doppler signals from spectrum signals to substantially sine wave, single frequency signals, the frequencies of which are essentially equal to the center frequency of the incoming Doppler spectrum signals.

The outputs of these tracking units in the form of sine wave signals are fed to wave form conversion units which provide D.-C. voltages proportional to the frequencies of the signals from the tracking units. These D.-C. voltages drive servo mechanisms which produce amplitude modulated signals at a particular reference carrier frequency. The amplitudes of these signals are proportional to the incoming Doppler signal center frequencies. The Doppler return signals obtained in this form are then easily combined by appropriate sum and difference amplifiers to provide the required control signals in an aircraft coordinate system. Thus, at the latter point in the system mere addition or subtraction is required and no elaborate computation equipment is necessary.

The invention may be best described with the help of the drawings in which:

FIG. 1 shows a pictorial representation of one embodiment of the invention;

FIG. 2 represents a top view of the vector orientation of the antennas of the embodiment of the invention shown in FIG. 1 with respect to a reference coordinate system;

FIG. 3 represents a side view of the vector orientation of the antennas of the embodiment of the invention shown in FIG. 1 with respect to the reference coordinate system;

FIG. 4 represents a block diagram of a summation network used to combine the antenna Doppler signals for producing signals proportional to the velocity of the aircraft shown in FIG. 1;

FIG. 5 represents a general block diagram of a Doppler navigation computer system of the invention; and FIG. 6 represents a more detailed block diagram of the receiver, tracking and wave form conversion units, and the velocity computer units shown in the Doppler navigation system of FIG. 5.

In FIG. 1 there is shown an aircraft 10 within the underside of which is mounted an antenna system 14. Antenna system 14 has connected to it a transmitter 25 and a receiver signal system 26. Receiver signal system 26 provides three Doppler signals $D_{11}$, $D_{12}$ and $(-D_{13})$. A summation network 24 is electrically connected to receiver signal system 26. As shown in FIG. 4, summation network 24 receives three Doppler signals $D_{11}$, $D_{12}$ and $(-D_{13})$ and combines them in such a way as to produce three signals $f_H$, $f_{CH}$ and $f_V$, the frequencies of which are proportional to the aircraft heading velocity, cross-heading velocity, and vertical velocity, respectively. The manner in which the three Doppler signals are combined is explained below with reference to Equations 1—6 which follow. To clarify the description of the invention, aircraft 10 is shown in level flight substantially parallel to the ground and the size of the antenna configuration is exaggerated with respect to the size of aircraft 10.

To explain the operation of the invention, it is necessary to define a reference coordinate system such as that represented by coordinate system 18, made up of coordinates 15, 16, and 17. Coordinate 15 lies along a direction parallel to the heading velocity vector 19 of the aircraft. The heading velocity vector is designated as $\overline{H}$. The positive heading velocity vector is defined as being substantially in the forward direction of the nose of the aircraft. Coordinate 16 lies along the direction of the aircraft's cross-heading velocity vector 20 which is defined as being perpendicular to the direction of the heading velocity vector. The cross-heading velocity vector is designated as $\overline{CH}$. The positive cross-heading velocity vector is defined as being in a direction along the right wing of the aircraft and perpendicular to the heading velocity vector. Coordinate 17 lies along a direction parallel to the vertical velocity vector 21 of the aircraft. The vertical velocity vector is designated as $\overline{V}$. The positive vertical velocity vector is defined as being in a downward direction and is perpendicular to both the heading velocity vector and the cross-heading velocity vector. Reference coordinate system 18 is thereby defined as a left-handed orthogonal system as shown in FIG. 1. It is understood that origin 23 of coordinate system 18 in FIG. 1 could be placed coincident with origin 22 of antenna system 14. However, for the sake of clarity, it has been placed in this particular figure at a point removed from the aircraft. Nonetheless, as understood in the art, the angular relationships herein discussed still validly apply.

Antenna system 14 is made up of three antennas which are designated as 11, 12, and 13 and which, in accordance with the invention, are arranged in a predetermined angular relationship with the coordinates 15, 16, and 17 of coordinate system 18. In order to explain the predetermined angular relationship that is required, it is helpful to use the vector diagrams of FIGS. 2 and 3.

In FIGS. 2 and 3, origin 22 of antenna system 14 is represented as being coincident with origin 23 of coordinate system 18 in order to show more clearly the angular relationships involved. FIG. 2 shows a top view of the antenna system looking down in the positive direction along vertical coordinate 17. Antenna 11 is arranged so that its beam subtends an angle having a magnitude A with the positive direction of coordinate 15. Antenna 12 is situated on the opposite side of coordinate 15 and is arranged so that its beam subtends an angle having an equal magnitude A with the positive direction of coordinate 15. Antenna 13 is arranged so that its beam subtends an angle having an equal magnitude A with the negative direction of coordinate 15.

FIG. 3 shows a side view of antenna system 14 looking down in a negative direction along cross-heading coordinate 16 of reference coordinate system 18. In FIG. 3 it can be seen that antennas 11 and 12 are situated on one side of coordinate 17 and are arranged so that their beams subtend equal angles each having a magnitude B with the positive direction of coordinate 17. Antenna 13 is situated on the other side of coordinate 17 and subtends an angle B with the positive direction of coordinate 17. It can be seen, therefore, from FIGS. 2 and 3 that antennas 11, 12, and 13 each subtend angles which are substantially equal in magnitude with respect to particular coordinates 15, 16, or 17. Because the angles A and B have been so chosen, the angles subtended by the antenna beams with the cross-heading coordinate are also uniquely determined. By this choice of antenna orientation, the cosines of these angles are all identical with the exception of their signs.

It is well known that the equations for the Doppler frequencies observed at antennas 11, 12, and 13 can be written:

$$(a) \quad D_{11}=K_{11}f_H-K_{12}f_{CH}-K_{13}f_V \quad (1)$$
$$(b) \quad D_{12}=K_{11}f_H+K_{12}f_{CH}-K_{13}f_V \quad (2)$$
$$(c) \quad (-D_{13})=+K_{11}f_H-K_{12}f_{CH}+K_{13}f_V \quad (3)$$

where: $D_{11}$, $D_{12}$ and $(-D_{13})$ are the Doppler frequencies as observed at antennas 11, 12, and 13, respectively; $f_H$, $f_{CH}$, $f_V$ are frequencies proportional to heading, cross-heading and vertical velocities, respectively; and $K_{11}$, $K_{12}$ and $K_{13}$ are the absolute values of the co-sines of the angles between the antennas and the appropriately associated coordinates of coordinate system 18. For example, $K_{11}$ is equal to the absolute value of cosine A, where A is the angle that each antenna subtends with respect to direction of the aircraft heading vector. The notations $K_{12}$ and $K_{13}$ refer similarly to the cross-heading and vertical velocity vectors, respectively.

The Doppler frequency $(-D_{13})$ derived from antenna 13 is considered a negative quantity with respect to the frequencies $D_{11}$ and $D_{12}$ for analytical purposes. In actual practice, however, the Doppler frequency appears as a real positive frequency. Therefore, in order to indicate the nature of the operations being performed by antenna 13, the notation $(-D_{13})$ has been used.

Mathematically, in order to obtain the frequencies $f_H$, $f_{CH}$ and $f_V$, it is merely necessary to add or subtract appropriate combinations of Equations 1, 2, or 3 and solve for the desired frequency. For example, in order to obtain $f_H$, Equation 2 is added to Equation 3 and the resulting equation is solved for the quantity $f_H$ to give the following equation:

$$f_H = \frac{D_{12}+(-D_{13})}{2K_{11}} \quad (4)$$

In order to obtain the frequency $f_{CH}$, Equation 1 is subtracted from Equation 2 and the resulting equation is solved for $f_{CH}$ to provide the following equation:

$$f_{CH} = \frac{D_{12}-D_{11}}{2K_{12}} \quad (5)$$

In order to obtain the frequency $f_V$, Equation 1 is subtracted from Equation 3 and the resulting equation is solved for $f_V$ to provide the following equation:

$$f_V = \frac{(-D_{13})-D_{11}}{2K_{13}} \quad (6)$$

Thus, it can be seen from Equations 4, 5, and 6 that, in order to obtain signals whose frequencies are proportional to the heading velocity, cross-heading velocity, and vertical velocity, it is only necessary to add or subtract the Doppler signals from the appropriate antennas and to multiply by an appropriate constant according to Equations 4, 5, and 6. None of the operations involves any multiplication by variable trigonometric functions because the predetermined angles between the antenna beams and the reference coordinates are constant and determine the three constants $K_{11}$, $K_{12}$, and $K_{13}$.

Alternatively, Doppler signals $D_{11}$, $D_{12}$, and $D_{13}$ which represent aircraft velocities as measured in the antenna coordinate system may be converted to amplitude modulated signals which are then easily combined in sum and difference amplifier networks to provide amplitude modulated signals proportional to the aircraft velocities as measured in the aircraft coordinate system.

The antenna system shown with reference to FIGS. 1–4 is utilized in a Doppler navigation system which is described with reference to FIGS. 5 and 6.

A general block diagram of a system utilizing the antenna array of FIGS. 1–3 is shown in FIG. 5. In that figure, a transmitter 40, which may be a conventional frequency stabilized klystron, is used to transmit antenna signals having a fixed frequency $F_0$. These antenna signals are radiated by a set of three antennas which are oriented in the manner described with reference to FIGS. 1–3. It is understood that the system described herein may be either a pulsed Doppler system or a continuous wave Doppler system. In the former case, the transmitted and received antenna signals may utilize the same antenna array on a time-sharing basis. In the continuous wave system, one set of antennas may be utilized for transmitting signals and a separate set of antennas may be used for receiving return signals, as shown in FIG. 5. In the diagram of FIG. 5, a transmitting antenna system 41 is connected to transmitter 40. In either case, the antenna arrays involved have a geometric configuration as described with reference to FIGS. 1–3.

The return echo signals received by a receiving antenna array 42 have frequencies which are equal to the combined carrier frequency $F_0$ and Doppler frequencies $f_D$, denoted in the figure as $F_0 \pm f_D$. The return echo signals are fed to Doppler signal receiver, tracking, and wave conversion units 43 which provide signals $D_{11}$, $D_{12}$, and $D_{13}$ corresponding to the signals described with reference to Equations 1–3. These signals are amplitude modulated signals in which the modulation signal is proportional to the Doppler frequencies received at antennas 42 computed with reference to the antenna coordinate system. The output signals from receiver and tracking units 43 are fed to velocity computer units 44 which provide amplitude modulated signals $f_H$, $f_{CH}$, and $f_V$, the amplitudes of which are proportional to the heading, cross-heading, and vertical velocities of the aircraft computed with reference to aircraft coordinates. These signals are then combined with aircraft pitch and roll components received from earth-referenced system 80 in a Doppler stabilizer computer 45 for measuring aircraft ground speed and drift angle signals in an earth-referenced coordinate system for navigation purposes.

Because the antenna array for transmission and reception is arranged in the manner described with reference to FIGS. 1 and 3, the velocity computation is accomplished in a very simple manner by using conventional combining networks which correctly provide the sums and differences of the input amplitude modulated Doppler signals in accordance with Equations 4, 5, and 6.

FIG. 6 describes in more detail the block diagram of the system of FIG. 5. In FIG. 6, for the sake of clarity, only a single signal channel is shown in detail to indicate the signal flow process in the Doppler receiver, tracking and waveform conversion units. It is to be understood, however, that Channels I and II denoted by blocks 75 and 76 represent substantially the same operations with respect to $f_{D12}$ and $f_{D13}$ as is shown in detail with respect to $f_{D11}$. Thus, velocity information in terms of the signals $f_H$, $f_{CH}$ and $f_V$ may be obtained by the system of FIG. 6 with respect to the orthogonal directions of the aircraft coordinate system.

In FIG. 6 the incoming Doppler return echo signal, which for this channel is deemed to be received by forward looking antenna 11 having a frequency value represented by $F_0 + f_{D11}$ is fed from one of receiver antennas 42 to a mixer 47 where it is combined with a modulating reference signal having a frequency equal to $F_0 + F_{if}$.

The modulating reference signal is generated by a pair of ferrite modulators, thruplexers and a pair of magic-T's denoted in FIG. 6 by blocks 53, 70 and 71. A portion of the energy from transmitter 40 having a frequency $F_0$ is equally divided in a first magic-T, each arm of which contains a ferrite modulator. The driver windings of each ferrite modulator are excited by a signal from IF oscillator 50 having a frequency $F_{if}$. In each ferrite modulator, therefore, the transmitted energy at frequency $F_0$ is amplitude modulated to produce a center frequency $F_0$ and sidebands $F_0 \pm F_{if}$.

The amplitude modulated signals pass through thruplexers 70 that effectively remove the carrier frequency $F_0$ resulting in a double sideband, suppressed carrier modulated signal. These double sideband signals are fed to the collinear arms of a second magic-T 71. The lower sidebands are cancelled and the upper sidebands are reinforced and the second magic-T provides a signal having a frequency $F_0 + F_{if}$ which is fed to mixer 47 and similar mixers in Channels I and II.

It is to be understood that there are other ways of providing the frequency signal required from the ferrite modulation single-sideband generator described herein. For example, a crystal modulation system or a separate klystron local oscillator may be used without departing from the scope of the invention.

The output of mixer 47 provides a signal having a frequency equal to $F_{if} + f_{D11}$ which is amplified in IF amplifier 48. The output of amplifier 48 is fed to a conventional synchronous demodulator 49. Demodulator 49 is supplied with a demodulator reference frequency signal from IF oscillator 50. The output of demodulator 49 is a Doppler frequency spectrum signal $f_{D11}$ which is amplified in a A.-F. amplifier 51.

The output of amplifier 51 is fed to frequency tracking unit 52 which operates upon the incoming signal so as to determine the power center of gravity of the Doppler frequency spectrum signal $f_{D11}$. The purpose of tracking unit 52 is to change the spectrum signal $f_{D11}$ to substantially a sine wave signal $D_{11}$, the frequency of which corresponds to the frequency of the center frequency of the incoming spectrum signal.

Frequency tracking unit 52 includes a dual channel, zero-frequency discriminator unit which operates as part of an over-all automatic frequency control loop to provide the required Doppler frequency sine wave signal.

In the operation of frequency tracking unit 52, the incoming signal from amplifier 51 is combined in mixer 55 with a signal having a frequency $F_{LO}$ from a variable local oscillator 54. The output of mixer 55 is fed to the dual channels 58 and 59 of the discriminator which operates on a phase comparison basis to provide a D.-C. control signal. In each channel, the output of mixer 55 is combined with the output of fixed frequency oscillator 56 having a frequency $F_F$ that serves as a reference frequency source for the discriminator unit. The reference frequency signal from oscillator 56 supplied to one of the dual channels is phase shifted by 90° with respect to that supplied to the other channel. If the local oscillator frequency $F_{LO}$ from source 54 is displaced above the fixed frequency $F_F$ from source 56 by an amount exactly equal to the Doppler input frequency from amplifier 51, the frequency difference term produced by mixer 55 is exactly equal to the fixed frequency from source 56 and no discriminator output results at the output of phase comparator 60. However, if the frequency difference between oscillator frequency $F_{LO}$ and the incoming Doppler frequency is not equal to the fixed reference frequency $F_F$, the signal passing through channel A leads or lags the signal in channel B by an amount depending on whether the difference frequency error is above or below the reference frequency from source 56. The signal from channel A is either in phase or out of phase with the signal from channel B and, thus, when the signals from each channel are applied to phase comparator 60 either a positive or negative D.-C. voltage results. The D.-C. output voltage from phase comparator 60 is used as a feedback control voltage to change the frequency of variable local oscillator 54 in such a direction as to minimize the difference frequency error involved. The output from local oscillator 54 is then combined with the output from fixed oscillator 56 in a mixer 61. Mixer 61 provides an output signal, the frequency of which is equal to the center frequency of the Doppler frequency return spectrum and, as explained above, is a single frequency signal rather than a spectrum signal.

The output of frequency tracking unit 52 is fed to a waveform conversion unit 62. In waveform conversion unit 62 the output of mixer 61 is fed to amplifier and limiter unit 63 to provide a plurality of pulses which are fed to D.-C. conversion unit 64 which provides a D.-C. voltage proportional to the Doppler center frequency from frequency tracking unit 52. D.-C. conversion unit 64 may be a conventional diode-rate counting system having high stability properties. The D.-C. voltage from D.-C. conversion unit 64 is fed to servo amplifier and servo motor 65 which provides a shaft 66, the rotational position of which is proportional to the D.-C. input voltage from unit 64. A variable potentiometer 67 is placed on shafts 66 and is provided with reference excitation voltage from a reference oscillator 68 at a frequency $F_r$. Thus, the Doppler frequency information is converted at the output of potentiometer 67 into an amplitude modulated signal having a carrier frequency of $F_r$. Potentiometer 67 also provides a feedback signal to the D.-C. conversion unit as shown.

The output of servo driven potentiometer 67 is connected to the input of a velocity computer system equivalent to that shown as block 44 in FIG. 5 and to the summation network 24 shown in FIGS. 1 and 4. The velocity computer system comprises sum and difference amplifiers 69 which provide the computations expressed in Equations 4, 5, and 6. These amplifiers are of a type commercially available and conventionally used for sum and difference computation in analogue computers. Amplifiers 69 receive signals $D_{11}$, $D_{12}$ and $D_{13}$ from each receiving, tracking and waveform conversion channel and provide signals $f_H$, $f_{CH}$, and $f_V$ which are proportional to the velocity components of the aircraft relative to the aircraft coordinate system. These velocity component signals have amplitudes which are proportional to the heading velocity, the cross-heading velocity, and the vertical velocity.

Once these velocity components are known, the major needs of a Doppler navigation system are then available. To complete the navigation function, it is only necessary to resolve the aircraft velocities into whatever particular coordinate system may be desired for navigation purposes. For example, the simplest navigator need only resolve the heading and cross-heading velocity into a velocity vector along the ground to obtain the ground track and speed of the aircraft. A more elaborate Doppler navigation system may resolve the aircraft velocity vectors into a desired earth-referenced coordinate system and integrate these velocities to determine the position of the aircraft relative to an earth-referenced coordinate system.

As specifically shown with reference to FIG. 5, the signals $f_H$, $f_{CH}$, and $f_V$ are combined in an inertial coordinate system with signals representing pitch and roll rotations to provide output signals representative of aircraft ground speed and drift angle in an earth-referenced inertial coordinate system. The pitch and roll information may be obtained from a conventional gyro-stabilized platform system.

The antenna system of the invention shown in the drawings and described herein need not necessarily be fixedly mounted on an aircraft but may be movably mounted on an aircraft or other type of moving body, the velocity of which is to be measured. The antenna system need not be mounted directly to the frame of the moving body but may be mounted on some type of stabilized platform. Moreover, the particular form of the circuitry involved in the block diagram shown in FIG. 6 should readily be known to those skilled in the art and may vary depending on the applications on which the over-all system is to be used. Many refinements of the over-all system will occur to those skilled in the art without departing from the basic structure of the invention shown here.

Hence the invention is not to be construed as limited to the particular system shown and described herein except as defined by the appended claims.

What is claimed is:

1. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; transmitter means connected to said antenna system; receiver means connected to said antenna system and responsive to said Doppler return signals for providing a plurality of spectrum signals having frequencies proportional to the Doppler frequencies of said return signals; tracking means connected to said receiver means and responsive to said spectrum signals for providing a plurality of signals having frequencies substantially equal to the center frequencies of said spectrum signals; waveform conversion means connected to said tracking means for producing a plurality of amplitude modulated signals proportional to said center frequencies; and means for combining said amplitude modulated signals to provide a plurality of signals proportional to the velocity of said moving body.

2. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; transmitter means connected to said antenna system; receiver means connected to said antenna system and responsive to said Doppler return signals for providing a plurality of spectrum signals having frequencies proportional to the Doppler frequencies of said return signals; tracking means connected to said receiver means and including variable local oscillator means, fixed frequency oscillator means, means responsive to said local oscillator, said fixed oscillator, and to said spectrum signals for providing a plurality of signals having frequencies substantially equal to the center frequencies of said spectrum signals; waveform conversion means connected to said tracking means for producing a plurality of amplitude modulated signals proportional to said center frequencies; and means for combining said amplitude modulated signals to provide a plurality of signals proportional to the velocity of said moving body.

3. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; transmitter means connected to said antenna system; receiver means connected to said antenna system and responsive to said Doppler return signals for providing a plurality of spectrum signals having frequencies proportional to the Doppler frequencies of said return signals; tracking means connected to said receiver means and including a variable local oscillator, first mixing means connected to said local oscillator and to said receiver means, a fixed frequency oscillator, discriminator means connected to said mixing means and to said fixed frequency oscillator for providing a control voltage proportional to the frequency difference between the output signal from said first mixing means and the signal from said fixed frequency oscillator, said control voltage connected to said variable local oscillator to change the frequency of the signal from said local oscillator so as to reduce said frequency difference to a minimum, second mixing means connected to said local oscillator and to said fixed frequency oscillator for providing a plurality of signals having frequencies substantially equal to the center freqencies of said spectrum signals; waveform conversion means connected to said tracking means for producing a plurality of amplitude modulated signals proportional to said center frequencies; and means for combining said amplitude modulated signals to provide a plurality of signals proportional to the velocity of said moving body.

4. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; transmitter means connected to said antenna system; receiver means connected to said antenna system and responsive to said Doppler return signals for providing a plurality of spectrum signals having frequencies proportional to the Doppler frequencies of said return signals; tracking means connected to said receiver means and responsive to said spectrum signals for providing a plurality of signals having frequencies substantially equal to the center frequencies of said spectrum signals; waveform conversion means connected to said tracking means including means for converting said center frequency signals to substantially direct voltage signals, servomechanism means responsive to said direct voltage signals for producing a plurality of amplitude modulated signals proportional to said center frequencies; and means for combining said amplitude modulated signals to provide a plurality of signals proportional to the velocity of said moving body.

5. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; transmitter means connected to said antenna system; receiver means connected to said antenna system and responsive to said Doppler return signals for providing a plurality of spectrum signals having frequencies proportional to the Doppler frequencies of said return signals; tracking means connected to said receiver means and responsive to said spectrum signals for providing a plurality of signals having frequencies substantially equal to the center frequencies of said spectrum signals; waveform conversion means connected to said tracking means including means for converting said center frequency signals to substantially direct voltage signals, means responsive to said direct voltage signals for driving a plurality of servo motors to provide shaft rotations in response to said direct voltage signals, potentiometer means mounted on said shafts, a reference oscillator for exciting said potentiometer means for producing a plurality of amplitude modulated signals proportional to said center frequencies; and means for combining said amplitude modulated signals to provide a plurality of signals proportional to the velocity of said moving body.

6. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; tranmitter means connected to said antenna system; receiver means connected to said antenna system and to said transmitter means including ferrite modulator means for providing a reference signal, mixing means connected to said antenna system and to said ferrite modulator means for producing intermediate frequency signals, demodulation means connected to said mixing means for providing a plurality of spectrum signals having frequencies proportional to the Doppler frequencies of said return signals; tracking means connected to said receiver means and responsive to said spectrum signals for providing a plurality of signals having frequencies substantialy equal to the center frequencies of said spectrum signals; waveform conversion means connected to said tracking means for producing a plurality of amplitude modulated signals proportional to said center frequencies; and means for combining said amplitude modulated signals to provide a plurality of signals proportional to the velocity of said moving body.

7. A Doppler navigation system comprising, in combination, a moving body; an antenna system mounted on said moving body including a plurality of antennas capable of radiating signals and of receiving Doppler return signals, each of said antennas subtending a first predetermined angle with respect to one of a plurality of reference coordinates and each of said antennas subtending a second predetermined angle with respect to another of said reference coordinates, said first predetermined angles being substantially equal in magnitude and said second predetermined angles being substantially equal in magnitude; transmitter means connected to said antenna system; receiver means connected to said antenna system and responsive to said Doppler return signals for providing a plurality of spectrum signals having frequencies proportional to the Doppler frequencies of nsaid return signals; tracking means connected to said receiver means and responsive to said spectrum signals for providing a plurality of signals having frequencies substantially equal to the center frequencies of said spectrum signals; waveform conversion means connected to said tracking means for producing a plurality of amplitude modulated signals proportional to said center frequencies; and sum and difference amplifier means for combining said amplitude modulated signals to provide a plurality of signals proportional to the velocity of said moving body.

References Cited in the file of this patent
UNITED STATES PATENTS

| | | |
|---|---|---|
| 2,857,590 | Berger | Oct. 21, 1958 |
| 2,866,190 | Berger | Dec. 23, 1958 |
| 2,911,644 | Stavis | Nov. 3, 1959 |
| 2,981,944 | Washburne | Apr. 25, 1961 |